United States Patent
Zeng

(10) Patent No.: US 10,146,006 B2
(45) Date of Patent: Dec. 4, 2018

(54) REFLECTIVE SHEET HAVING RECEIVING SLOT FOR RECEIVING LIGHT SOURCE, BACKLIGHT MODULE AND DISPLAY SCREEN USING THE SAME

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 195 days.

(21) Appl. No.: 15/007,314

(22) Filed: Jan. 27, 2016

(65) Prior Publication Data

US 2017/0139127 A1  May 18, 2017

(30) Foreign Application Priority Data

Nov. 17, 2015  (CN) .......................... 2015 1 0788006

(51) Int. Cl.
| | |
|---|---|
| F21V 8/00 | (2006.01) |
| G02B 13/00 | (2006.01) |
| G02B 21/00 | (2006.01) |
| G02B 6/12 | (2006.01) |

(52) U.S. Cl.
CPC ........... *G02B 6/0091* (2013.01); *G02B 6/002* (2013.01); *G02B 6/005* (2013.01); *G02B 6/0055* (2013.01); *G02B 6/0068* (2013.01); *G02B 6/0073* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0001207 A1* | 5/2001 | Shimizu | ............ | C09K 11/7774 |
| | | | | 257/98 |
| 2010/0149835 A1* | 6/2010 | Cho | ..................... | G02B 6/0091 |
| | | | | 362/612 |
| 2011/0096569 A1* | 4/2011 | Hamada | .............. | G02B 6/0085 |
| | | | | 362/613 |
| 2011/0141397 A1* | 6/2011 | Lee | ..................... | G02B 6/0083 |
| | | | | 349/64 |

* cited by examiner

*Primary Examiner* — Lauren Nguyen
(74) *Attorney, Agent, or Firm* — Andrew C. Cheng

(57) ABSTRACT

A reflective sheet, a backlight module and a display screen. The reflective sheet includes a first sheet body disposed between a light guide plate and LED light sources, a second and a third sheet bodies respectively formed by bending and extending from upper and lower edges of the first sheet body, a fourth sheet body formed by bending and extending from an edge of the third sheet body. The first, the third and the fourth sheet bodies are enclosed commonly to form a receiving slot where the LED light sources are disposed. The first sheet body has multiple light transmitting holes such that lights of the LED light sources can enter the light guide plate. A surface of the first sheet body except the light transmitting holes can reflect lights leaked from gap regions among the LED light sources back to the light guide plate to increase light utilization rate.

13 Claims, 5 Drawing Sheets

REFLECTIVE SHEET HAVING RECEIVING SLOT FOR RECEIVING LIGHT SOURCE, BACKLIGHT MODULE AND DISPLAY SCREEN USING THE SAME

BACKGROUND OF THE INVENTION

1. Field of the Invention

The present invention relates to a display technology field, and more particularly to a reflective sheet, and a backlight module and a display screen using the same.

2. Description of Related Art

Currently, using a liquid crystal display device as a display part in an electric equipment is widely applied in various electric products. A backlight module is an important component in the liquid crystal display device. The function of the backlight module is to provide a sufficient brightness and an evenly distributed light source. Therefore, a lighting effect of the backlight module will directly affect the visual effect of the liquid crystal display device so that people requires a better design of the backlight module.

As shown in FIG. 1, a conventional backlight module mainly includes a light guide plate 1, an LED light source 2, a flexible circuit board 3, an optical film group 4, a plastic frame 5, a reflective sheet 6 and an adhesive tape 7 for connecting above parts. Wherein, the flexible circuit board 3 and the LED light source 2 are fixed to the light guide plate 1 and the plastic frame 5 through the adhesive tape 7. The optical film group 4 is disposed above the light guide plate 1. In the above backlight module, multiple LEDs are disposed separately. With reference to FIG. 2 and FIG. 3, in order to receive the LED light source 2, an inner side of the plastic frame 5 adjacent to the LED light source 2 is provided with multiple protrusion structures 8, and each LED light source is disposed between two adjacent protrusion structures. Because the LED light sources are separated, when the LED light sources emit lights, the lights are leaked out at gaps between adjacent LED light sources such that the lights emitted from the LED light sources toward the light guide plate 1 will generate a bright region and a dark region which is known as a hotspot phenomenon. The hotspot phenomenon will seriously affect the optical quality of the backlight module. Besides, locations of the plastic frame corresponding to the dark regions of the lights will absorb lights reflected by the light guide plate so as to cause the loss of the lights and decrease the utilization efficiency of the lights.

A patent, CN 201220159480.2, discloses a backlight module without the hotspot phenomenon. The backlight module includes a light guide plate (LGP) and an LED bar located at a light incident side of the light guide plate. Between the light guide plate and the LED bar, a light atomization device is provided. Using the light atomization device, lights emitted from the LED bar are dispersed to be an entire and even light emitting source in order to eliminate the hotspot phenomenon.

A patent, CN 201210082715.7, discloses a backlight module and a liquid crystal display device, including a light guide plate, a light source and a backplane. Through disposing a cave extended toward external of the backlight module opposing to a light incident surface of the light guide plate at a side wall of the backplane, and placing the light source in the cave such that an inner distance of the light source and the plastic frame is increased. That is, "A" value is increased in order to effectively eliminate the dark region formed by the lights emitted from the light source.

A patent, CN 201210483485.5, discloses a backlight module including an LED light source, a light guide plate, a light guide bar disposed between the LED light source and the light guide plate and a microstructure on the light guide bar. Besides, the patent utilizes the microstructure to effectively improve the hotspot phenomenon.

Although the conventional art provides some methods to solve the hotspot phenomenon, some of the methods require using additional parts in the backlight module so that the product cost is increased, and some of the methods cannot achieve an expected result. Based on the above analysis, a more reasonable backlight module structure is required to use the light source effectively, decrease the risk of the hotspot phenomenon and simplify the design of the backlight module.

SUMMARY OF THE INVENTION

To overcome the deficiencies of the prior art, the purpose of the present invention is to provide a reflective sheet having an optimized structure, and a backlight module and a display screen using the reflective sheet in order to decrease the risk of the hotspot, increase the light utilization rate and simplify the backlight module design.

Specifically, the present invention includes three aspects.

In the first aspect, the present invention relates to a reflective sheet applied in a backlight module, comprising: a first sheet body; a second sheet body; a third sheet body; and a fourth sheet body; wherein, the first sheet body is a flat plate having multiple light transmitting holes; the second sheet body and the third sheet body are formed by respectively bending and extending from two opposite side edges of the first sheet body toward opposite directions; the fourth sheet body is formed by bending and extending from an edge of the third sheet body; the fourth sheet body and the first sheet body are disposed oppositely; the first sheet body, the third sheet body and the fourth sheet body are enclosed commonly to form a receiving slot.

Wherein, the reflective sheet further includes a fifth sheet body formed by bending and extending from an edge of the fourth sheet body, and the fifth sheet body and the second sheet body are respectively extended toward opposite directions.

Wherein, a surface of the first sheet body is coated with a diffusion layer, and the surface of the first sheet body faces toward the second sheet body.

In the second aspect, the present invention relates to a backlight module, comprising: a light guide plate; multiple LED light sources disposed at a side of the light guide plate; a flexible circuit board disposed above the LED light sources; an optical film group disposed above a top surface of the light guide plate; a plastic frame disposed at an outer periphery of the light guide plate, the LED light sources and the optical film group; and a reflective sheet including a first sheet body, a second sheet body, a third sheet body, and a fourth sheet body; wherein, the first sheet body is a flat plate having multiple light transmitting holes, and disposed between the light guide plate and the LED light sources; the second sheet body is formed by bending and extending from a lower edge of the first sheet body along a direction toward the light guide plate, and the second sheet body is disposed below a bottom surface of the light guide plate; the third sheet body is formed by bending and extending from an upper edge of the first sheet body along a direction toward the LED light sources, and the third sheet body is disposed above the flexible circuit board; the fourth sheet body is formed by bending and extending from an edge of the third sheet body; the fourth sheet body and the first sheet body are disposed oppositely; the first sheet body, the third sheet body and the fourth sheet body are enclosed commonly to form a receiving slot; the LED light sources are disposed in the receiving slot; the LED light sources are disposed toward the light guide plate, and locations of the LED light sources are corresponding to the light transmitting holes one by one such that lights emitted from the LED light sources can enter the light guide plate.

Wherein, the reflective sheet further includes a fifth sheet body formed by bending and extending from a lower edge of the fourth sheet body; the fifth sheet body and the second sheet body are respectively extended toward opposite directions; the fourth sheet body and the fifth sheet body commonly form a pressing attachment region; a side of the plastic frame is adhered to the pressing attachment region.

Wherein, the plastic frame is rectangular.

Wherein, the first sheet body is a flat plate having a rectangular shape, and the first sheet body is provided with multiple light transmitting holes along a length direction, an upper edge and a lower edge of the first sheet body are both long sides.

Wherein, at a connection location between the first sheet body and the second sheet body, a length of the first sheet body is L1, a length of the second sheet body is L2 and L1<L2; at a connection location between the fourth sheet body and the fifth sheet body, a length of the fourth sheet body is L3, a length of the fifth sheet body is L4 and L3<L4.

Wherein, a surface of the first sheet body is coated with a diffusion layer, and the surface of the first sheet body faces toward the second sheet body.

Wherein the flexible circuit board disposed above the LED light sources is adhered and fixed to the third sheet body through a double-sided adhesive.

Wherein, the LED light source is a light-emitting diode light source, and the LED is a Light Emitting Diode.

In the third aspect, the present invention relates to a display screen including a liquid crystal panel and a backlight module as described above.

The beneficial effects of the present invention are as follows:

First, the present invention provides a new reflective sheet structure, wherein, the first sheet body is located between the LED light source and the light guide plate, because the first sheet body is provided with light transmitting holes matching with the LED light sources such that lights of LED light source can emit to the light guide plate, and the leaked light from the gap region of the LED light sources can be reflected back to the light guide plate in order to increase the lights in the dark region so as to increase the light utilization rate, decrease the risk of the hotspot phenomenon generated in the backlight module. Second, the reflective sheet of the present invention forms a receiving slot for receiving the LED light source through enclosing by the first sheet body, the third sheet body and the fourth sheet body to replace the protrusion structures in the conventional plastic frame for fixing the LED light source so that the structure of the plastic frame can be simplified. Only a rectangular plastic frame is required. Finally, because the reflective sheet provides the fifth sheet body, an adhesion region between the reflective sheet and the rectangular plastic frame in increased so that the structure of the backlight module is stronger.

DETAILED DESCRIPTION OF THE PREFERRED EMBODIMENT

First Embodiment

Figure 1:
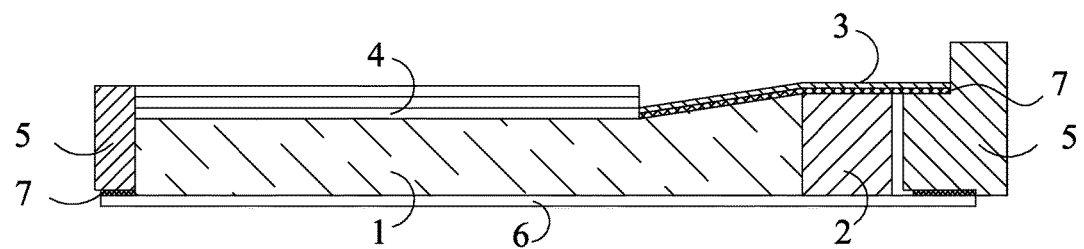
FIG. 1 is a schematic structure diagram of a backlight module in the conventional art.
Figure 2:
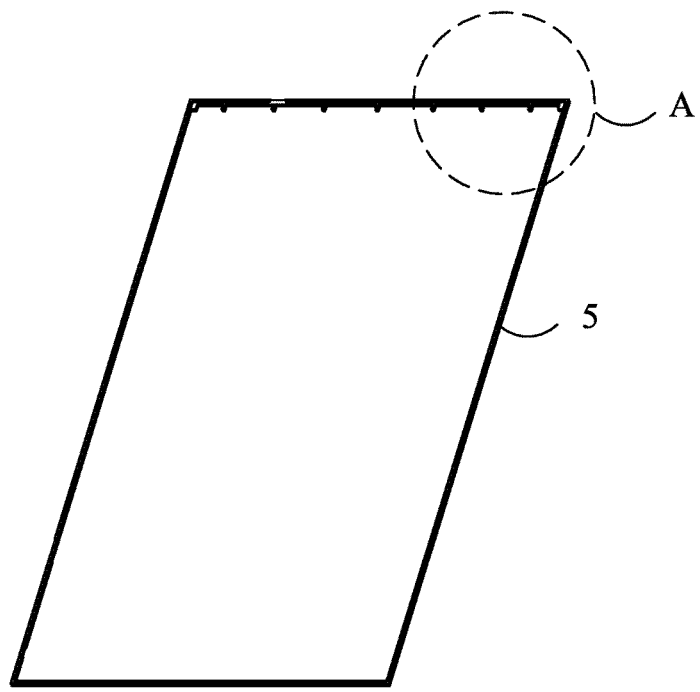
FIG. 2 is a schematic structure diagram of a plastic frame of the backlight module in the conventional art.
Figure 3:
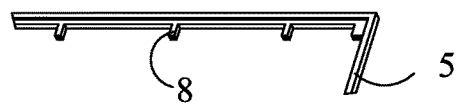
FIG. 3 is an enlarged schematic diagram of a structure at a portion A shown in FIG. 2.
Figure 4:
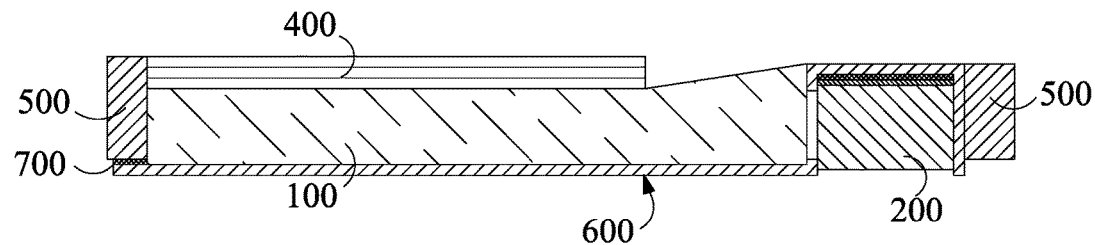
FIG. 4 is a schematic structure diagram of a backlight module according to a first embodiment of the present invention.
Figure 5:
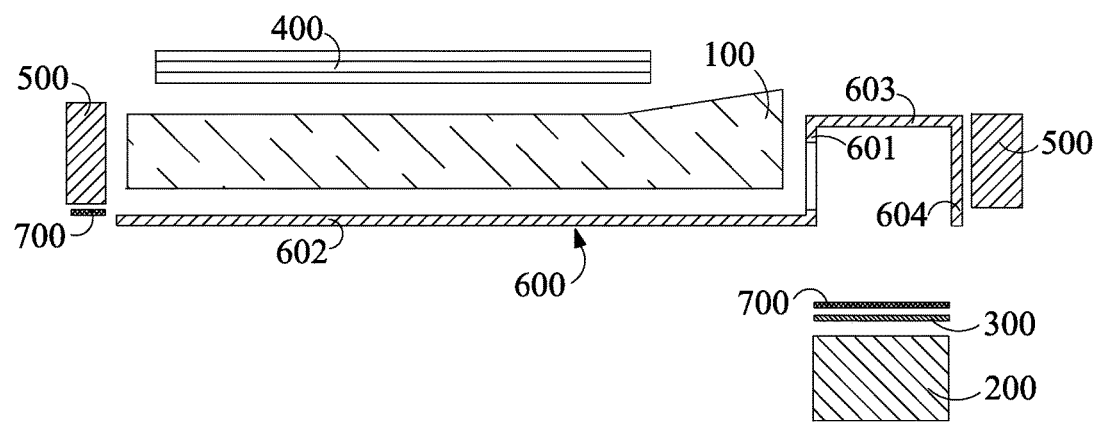
FIG. 5 is an exploded view of the backlight module shown in FIG. 4.
Figure 6:
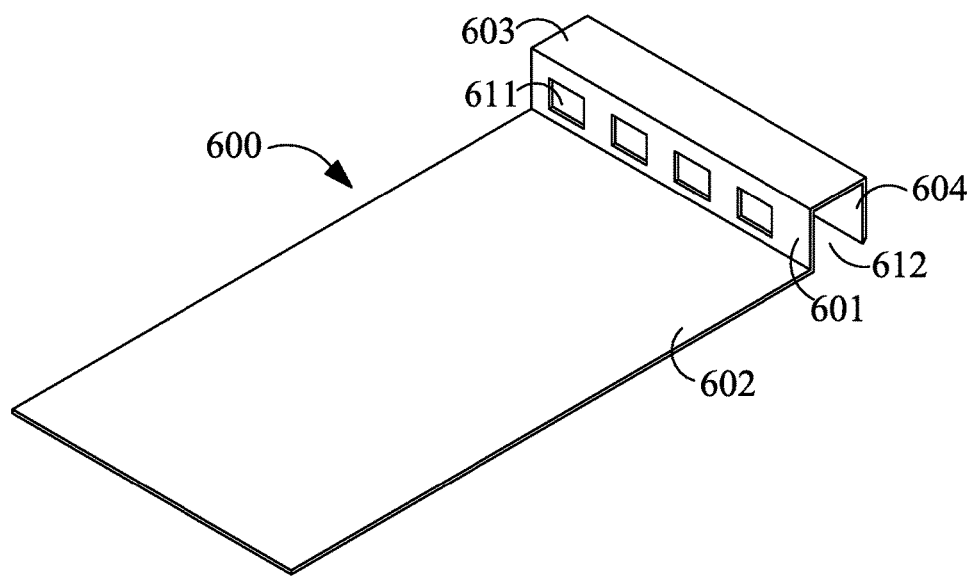
FIG. 6 is a schematic diagram of a reflective sheet in the first embodiment.

The present embodiment provides a backlight module. As shown in FIG. 4 and FIG. 5, the backlight module includes a light guide plate 100, a Light-Emitting Diode (LED) light source 200 disposed at a right side of the light guide plate 100 and a light source direction of the LED light source 200 is toward the light guide plate 100. A flexible circuit board 300 is disposed above the LED light source 200. An optical film group 400 is disposed above a top surface of the light guide plate 100 and away from the LED light source. A plastic frame 500 is disposed at an outer periphery of the light guide plate 100, the LED light source 200 and the optical film group 400. The backlight module further includes a reflective sheet 600. With reference to FIG. 5 and FIG. 6, the reflective sheet 600 includes a first sheet body 601, a second sheet body 602, a third sheet body 603 and a fourth sheet body 604.

Wherein, the first sheet body 601 is a flat plate having a rectangular shape, and the first sheet body 601 is disposed vertically between the light guide plate 100 and the LED light source 200. Along a length direction of the first sheet body 601, four light transmitting holes 611 are provided such that lights of the LED light source can enter the light guide plate 100. Besides, a surface of the first sheet body 601 except the four light transmitting holes 611 can reflect lights emitting to the surface back to the light guide plate 100.

From a lower edge of the first sheet body 601, bending and extending (that is, extending toward the left in FIG. 5) along a direction toward the light guide plate 100 to form the second sheet body 602. The second sheet body 602 is disposed below a bottom surface of the light guide plate 602.

From an upper edge of the first sheet body 601, bending and extending (that is, extending toward the right in FIG. 5) along a direction along toward the LED light source 200 to form the third sheet body 603. The third sheet body 603 is disposed above the flexible circuit board 300. The third sheet body 603 and the flexible circuit board 300 are adhered together through a double-sided adhesive 700. Wherein, the double-sided adhesive 700 is also known as a black and white adhesive tape (one side of the tape is black and the other side of the tape is white) or a black and black adhesive tape (one side of the tape is black and the other side of the tape is also black). Through the double-sided adhesive to tape to adhere the third sheet body 603 and the flexible circuit board 300 together, on one hand, a light shielding function is achieved, and on the other hand, the LED light source can be fixed.

From a right side edge of the third sheet body 603, bending and extending downwardly in order to form the fourth sheet body 604. The fourth sheet body 604 and the first sheet body 601 are disposed oppositely. The first sheet body 601, the third sheet body 603 and the fourth sheet body 604 are enclosed commonly to form a receiving slot 612. In the present embodiment four LED light sources 200 are disposed separately in the receiving slot 612 and locations of the LED light sources 200 are corresponding to the light transmitting holes 611 one by one. It can be understood that the reflective sheet 600 of the present invention can provide different number of the light transmitting holes 611 according to an actual conditions. For example, the reflective sheet 600 can provide five, six, seven or eight light transmitting holes 611 in order to meet the requirement for the number of the LED light sources 200.

Because the multiple LED light sources are disposed separately, a gap region between adjacent LED light sources may become a dark region, and the light utilization rate is lower. However, in the present invention, the first sheet body 601 matching with the LED light sources 200 is provided. The light transmitting holes 611 on the first sheet body 601 can make lights to be emitted out, and a surface of the first sheet body 601 except the light transmitting holes 611 can reflect lights emitting to the gap region of the adjacent LED light sources back to the light guide plate 100 in order to increase the lights in the dark region and increase the light utilization rate. Besides, in the present embodiment, in order to further solve the hotspot problem, on a surface of the first sheet body 601 which is toward the second sheet body 602 (that is, a left side surface of the first sheet body 601 in FIG. 5) is coated with a diffusion layer (not shown in the figures) that can evenly diffuse reflected lights in order to increase the lights in the dark region and lower the risk of the hotspot.

Figure 7:
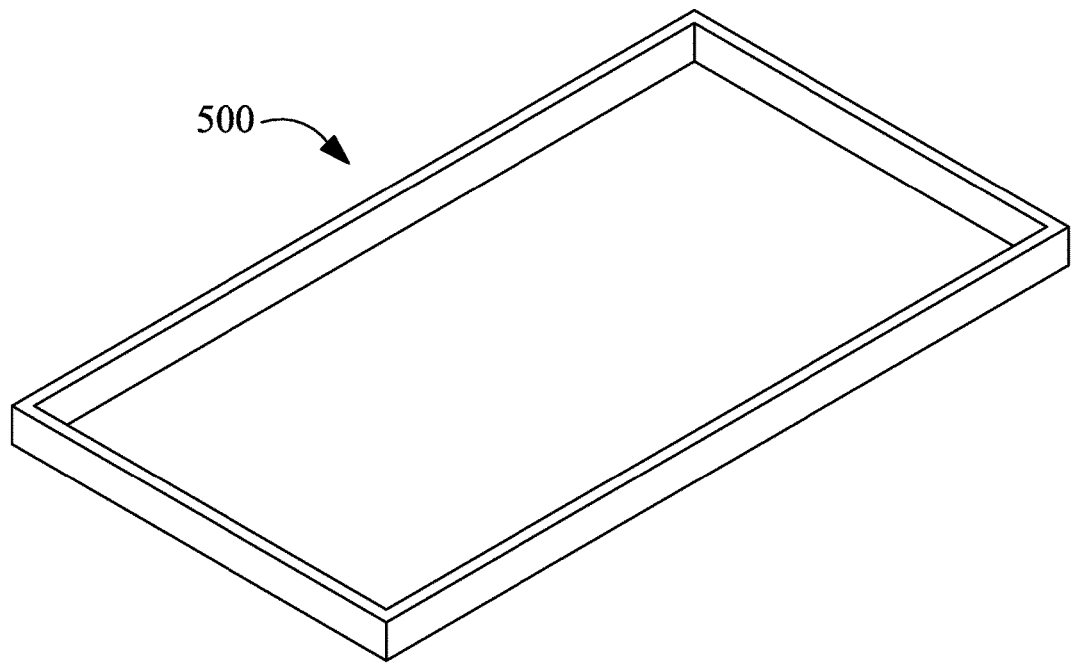
FIG. 7 is a schematic diagram of a plastic frame in the first embodiment.

Besides, because the structure of the reflective sheet in the present embodiment is enclosed to form the receiving slot which can receive the LED light sources, the plastic frame of the present embodiment can be simplified. No need to dispose protrusion structures for fixing the LED light sources in the plastic frame as the conventional art. Specifically, in the present embodiment, as shown in FIG. 7, the plastic frame 500 is a rectangular plastic frame. With reference to FIG. 4 and FIG. 5, the plastic frame 500 is adhered and fixed to an edge of the second sheet body 602 away from the LED light sources (that is, a left side edge of the second sheet body 602) through a double-sided adhesive 700. It can be understood that the plastic frame can also be adhered and fixed to the reflective sheet through other common adhesion methods, or when the reflective sheet and the other sheets have suitable adhesion locations, the reflective sheet and the other sheets can also be used for adhering the plastic frame. For example, the plastic frame can also be adhered to an outer side surface of the fourth sheet body of the reflective sheet.

Figure 8:
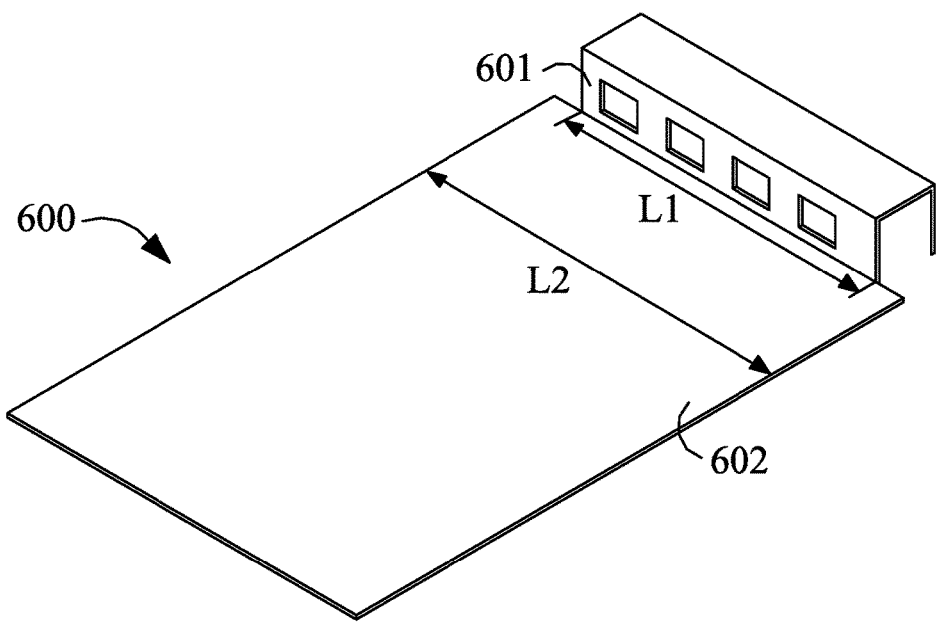
FIG. 8 is a preferred structure of the reflective sheet in the first embodiment.

Because in the present embodiment, the plastic frame is directly adhered to the reflective sheet, in order to increase an adhesion strength of the plastic frame and the reflective sheet, an optimum design can be performed to the reflective sheet. Specifically, as shown in FIG. 8, at a connection location between the first sheet body 601 and the second sheet body 602, a length of the first sheet body 601 is L1, a length of the second sheet body 602 is L2 and L1<L2. That is, two side edges of the second sheet body 602 have a certain of adhesion region for adhering the plastic frame and the reflective sheet. Because the entire adhesion area is increased, the adhesion between the plastic frame and the reflective sheet is stronger.

The present embodiment also provides a reflective sheet used for the backlight module. The reflective sheet is the reflective sheet in above backlight module, no more repeating.

The present embodiment also provides a display screen including a liquid crystal panel and a backlight module. The backlight module is the backlight module described above, no more repeating.

Second Embodiment

Figure 9:
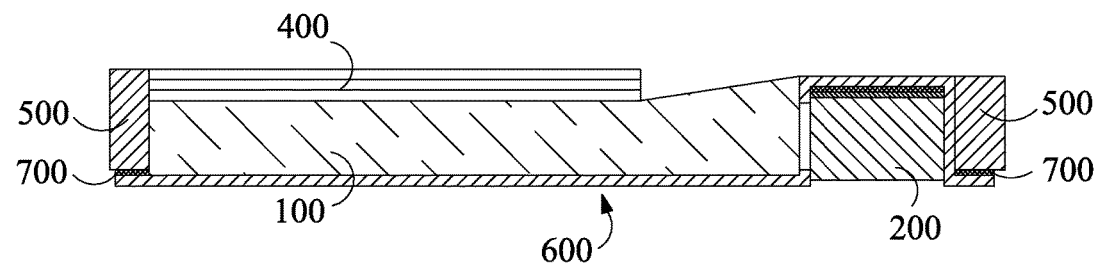
FIG. 9 is a schematic diagram of a backlight module in a second embodiment.
Figure 10:
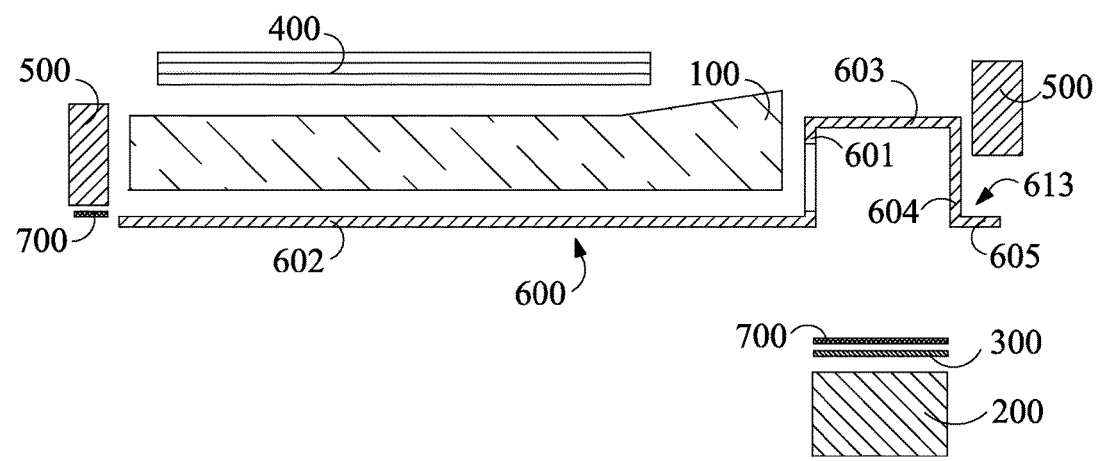
FIG. 10 is an exploded view of the backlight module shown in FIG. 9.
Figure 11:
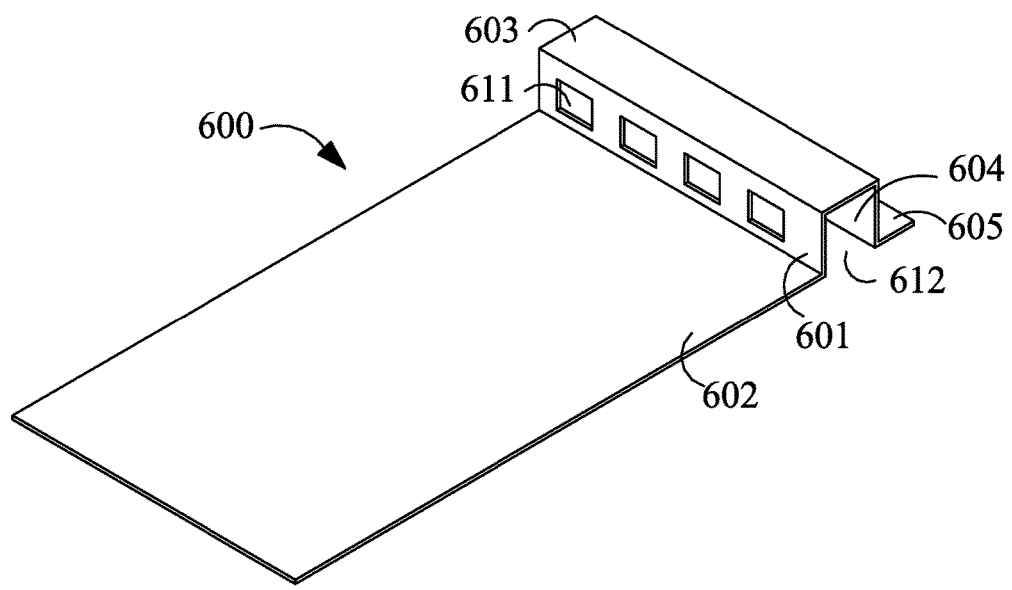
FIG. 11 is a schematic diagram of a reflective sheet in the second embodiment.

The present embodiment provides a backlight module. As shown in FIG. 9 and FIG. 10, the backlight module includes a light guide plate 100, an LED light source 200 disposed at a right side of the light guide plate 100 and a light source direction is toward the light guide plate 100. A flexible circuit board 300 is disposed above the LED light source 200. An optical film group 400 is disposed above a top surface of the light guide plate 100 and away from the LED light source. A plastic frame 500 is disposed at an outer periphery of the light guide plate 100, the LED light source 200 and the optical film group 400. The backlight module further includes a reflective sheet 600. With reference to FIG. 10 and FIG. 11, the reflective sheet 600 includes a first sheet body 601, a second sheet body 602, a third sheet body 603, a fourth sheet body 604 and a fifth sheet body 605.

Wherein, the first sheet body 601 is a flat plate having a rectangular shape, and the first sheet body 601 is disposed vertically between the light guide plate 100 and the LED light source 200. Along a length direction of the first sheet body 601, four light transmitting holes 611 are provided such that lights of the LED light source can emit out to the light guide plate 100. Besides, a surface of the first sheet body 601 except the four light transmitting holes 611 can reflect lights emitting to the surface back to the light guide plate 100.

From a lower edge of the first sheet body 601, bending and extending (that is, extending toward the left in FIG. 10) along a direction toward the light guide plate 100 to form the second sheet body 602. The second sheet body 602 is disposed below a bottom surface of the light guide plate 602.

From an upper edge of the first sheet body 601, bending and extending (that is, extending toward the right in FIG. 10) along a direction toward the LED light source 200 to form the third sheet body 603. The third sheet body 603 is disposed above the flexible circuit board 300. The third sheet body 603 and the flexible circuit board 300 are adhered together through a double-sided adhesive 700. Wherein, the double-sided adhesive 700 is also known as a black and white adhesive tape (one side of the tape is black and the other side of the tape is white) or a black and black adhesive tape (one side of the tape is black and the other side of the tape is also black). Through the double-sided adhesive to adhere the third sheet body 603 and the flexible circuit board 300 together, on one hand, a light shielding function is achieved, and on the other hand, the LED light source can be fixed.

From a right side edge of the third sheet body 603, bending and extending downwardly in order to form the fourth sheet body 604. The fourth sheet body 604 and the first sheet body 601 are disposed oppositely. The first sheet body 601, the third sheet body 603 and the fourth sheet body 604 are enclosed commonly to form a receiving slot 612. In the present embodiment, four LED light sources 200 are disposed separately in the receiving slot 612 and locations of the LED light sources 200 are corresponding to the light transmitting holes 611 one by one. It can be understood that the reflective sheet 600 of the present invention can provide different number of the light transmitting holes 611 according to an actual conditions. For example, the reflective sheet 600 can provide five, six, seven or eight light transmitting holes 611 in order to meet the requirement for the number of the LED light sources 200.

From a lower edge of the fourth sheet body 604, bending and extending to form a fifth sheet body 605. The fifth sheet body 605 and the second sheet body 602 are extended toward opposite directions (that is, fifth sheet body 605 is extended toward the right side in FIG. 10). The fourth sheet body 604 and the fifth sheet body 605 commonly form a pressing attachment region 613. The pressing attachment region 613 can strongly adhere a side of the plastic frame adjacent to the LED light source and the reflective sheet together.

Because the multiple LED light sources are disposed separately, a gap region between adjacent LED light sources may become a dark region, and the light utilization rate is lower. However, in the present invention, the first sheet body 601 matching with the LED light sources 200 is provided. The light transmitting holes 611 on the first sheet body 601 can make lights to be emitted out, and a surface of the first sheet body 601 except the light transmitting holes 611 can reflect lights which emits to the gap region of the adjacent LED light sources back to the light guide plate 100 in order to increase the lights in the dark region and increase the light utilization rate. Besides, in the present embodiment, in order to further solve the hotspot problem, on a surface of the first sheet body 601 which is toward the second sheet body 602 (that is, a left side surface of the first sheet body 601 in FIG. 10) is coated with a diffusion layer (not shown in the figures) that can evenly diffuse reflected lights in order to increase the lights in the dark region and lower the risk of the hotspot.

Figure 12:
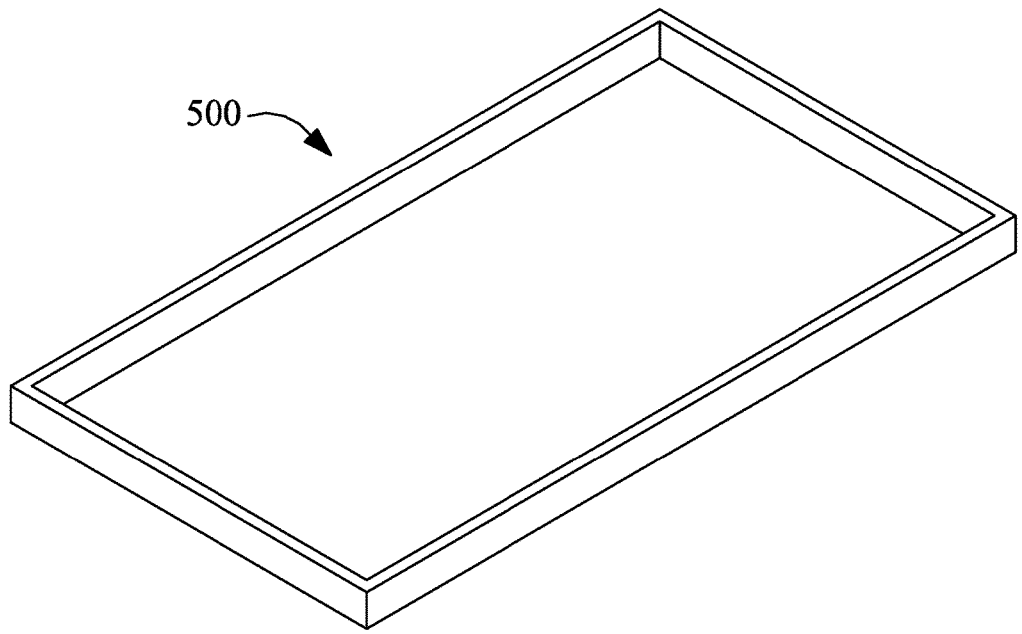
FIG. 12 is a schematic diagram of a plastic frame in the second embodiment.

Besides, because the structure of the reflective sheet in the present embodiment is enclosed to form the receiving slot which can receive the LED light sources, the plastic frame of the present embodiment can be simplified. No need to dispose protrusion structures for fixing the LED light sources in the plastic frame as the conventional art. Specifically, in the present embodiment, as shown in FIG. 12, the plastic frame 500 is a rectangular plastic frame. With reference to FIG. 9 and FIG. 10, the plastic frame 500 is adhered and fixed to an edge of the second sheet body 602 away from the LED light sources (that is, a left side edge of the second sheet body 602 in FIG. 9) and the pressing attachment region 613 through a double-sided adhesive 700. It can be understood that the plastic frame can also be adhered and fixed to the reflective sheet through other common adhesion methods, or when the reflective sheet and the other sheets have suitable adhesion locations, the reflective sheet and the other sheets can also be used for adhering the plastic frame. For example, the plastic frame can also be adhered to an outer side surface of the fourth sheet body of the reflective sheet.

Figure 13:
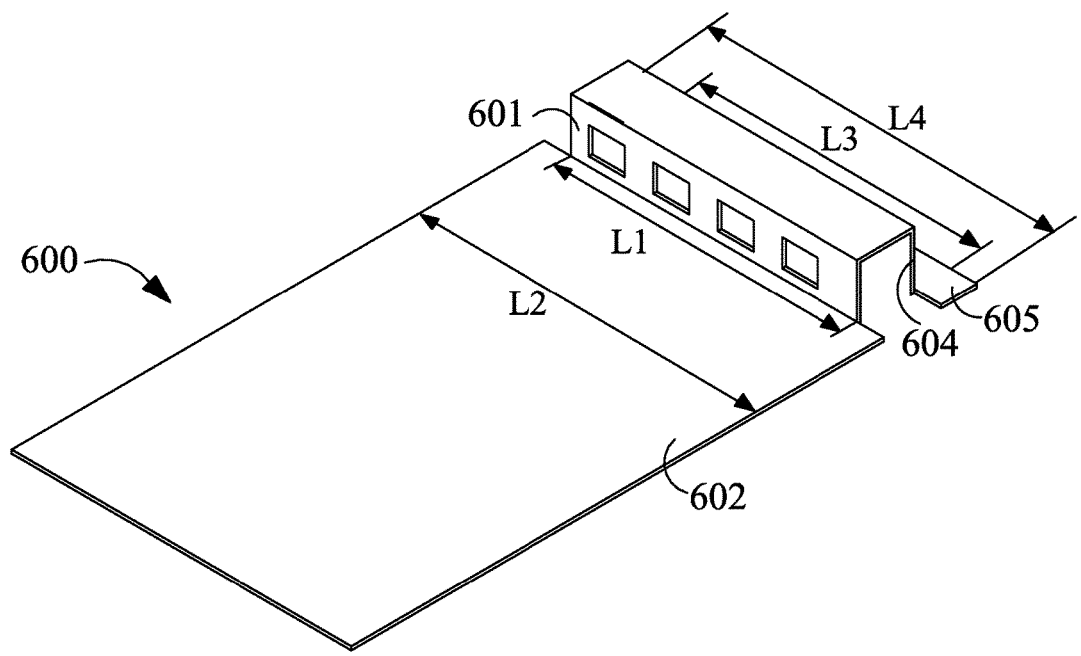
FIG. 13 is a preferred structure of the reflective sheet in the second embodiment.

Because in the present embodiment, the plastic frame is directly adhered to the reflective sheet, not adhered to the LED light source, in order to increase an adhesion strength of the plastic frame and the reflective sheet, an optimum design can be performed to the reflective sheet. Specifically, as shown in FIG. 13, at a connection location between the first sheet body 601 and the second sheet body 602, a length of the first sheet body 601 is L1, a length of the second sheet body 602 is L2 and L1<L2. That is, two side edges of the second sheet body 602 have a certain of adhesion region for adhering the plastic frame and the reflective sheet. At a connection location between the fourth sheet body 604 and the fifth sheet body 605, a length of the fourth sheet body 604 is L3, a length of the fifth sheet body 605 is L4 and L3<L4. That is, two side edges of the fifth sheet body 605 have a certain of adhesion region for adhering the plastic frame and the reflective sheet. Because the entire adhesion area is increased, the adhesion between the plastic frame and the reflective sheet is stronger. In the present embodiment, L1 and L3 are equal, and L2 and L4 are equal. However, in an actual application, according to a specific condition, L1 and L3 can be different, and L2 and L4 can also be different.

The present embodiment also provides a reflective sheet used for the backlight module. The reflective sheet is the reflective sheet in above backlight module, no more repeating.

The present embodiment also provides a display screen including a liquid crystal panel and a backlight module. The backlight module is the backlight module described above, no more repeating.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A backlight module, comprising:
a light guide plate;
multiple light-emitting diode (LED) light sources disposed at a side of the light guide plate;
a flexible circuit board disposed above the LED light sources;
an optical film group disposed above a top surface of the light guide plate;
a plastic frame disposed at an outer periphery of the light guide plate, the LED light sources and the optical film group; and
a reflective sheet including a first sheet body, a second sheet body, a third sheet body, and a fourth sheet body;
wherein the first sheet body is a flat plate having multiple light transmitting holes and extending in a first direction, the first sheet body having first and second side surfaces that are opposite to each other, and the first sheet body is disposed between the light guide plate and the LED light sources such that the light guide plate and the LED light sources are respectively located at two opposite side surfaces of the first sheet body;
the second sheet body is formed by bending and integrally extending from a lower edge of the first sheet body in a direction toward the light guide plate, the second sheet body being disposed below a bottom surface of the light guide plate, wherein the second sheet body and the first sheet body collectively define a first space in which the light guide plate is received and supported on the second sheet body, the second sheet body being on the first side surface of the first sheet body;

the third sheet body is formed by bending and integrally extending from an upper edge of the first sheet body, which is opposite to the lower edge of the first sheet body, in a direction toward the LED light sources such that the third sheet body is on the second side surface of the first sheet body and is opposite to the second sheet body, the second sheet body and the third sheet body extending in opposite directions from the first sheet body and being respectively located on the first and second side surfaces of the first sheet body that are opposite to each other, and the third sheet body is disposed above the flexible circuit board; and the fourth sheet body is formed by bending and integrally extending from an edge of the third sheet body that is distant from the first sheet body such that the fourth sheet body and the first sheet body are opposite to and spaced from each other; wherein the fourth sheet body and the first sheet body face each other such that the first sheet body, the third sheet body and the fourth sheet body collectively define and delimit a receiving slot;

wherein the LED light sources are disposed in the receiving slot; the LED light sources are disposed toward the light guide plate, and locations of the LED light sources are corresponding to the light transmitting holes one by one such that lights emitted from the LED light sources can enter the light guide plate; and wherein the receiving slot that is defined collectively by the first sheet body, the third sheet body, and the fourth sheet body is located on the second side surface of the first sheet body such that the LED light sources received in the receiving slot are on the second side surface of the first sheet body and the light guide plate that is received in the space defined by the first sheet body and the second sheet body is located on the first side surface of the first sheet body and is opposite to the LED light sources.

2. The backlight module according to claim 1, wherein, the reflective sheet further includes a fifth sheet body formed by bending and extending from a lower edge of the fourth sheet body; the fifth sheet body and the second sheet body are respectively extended toward opposite directions; the fourth sheet body and the fifth sheet body commonly form a pressing attachment region; a side of the plastic frame is adhered to the pressing attachment region.

3. The backlight module according to claim 1, wherein, the plastic frame is rectangular.

4. The backlight module according to claim 2, wherein, the plastic frame is rectangular.

5. The backlight module according to one of claim 1, wherein, at a connection location between the first sheet body and the second sheet body, a length of the first sheet body is L1, a length of the second sheet body is L2 and L1<L2; at a connection location between the fourth sheet body and the fifth sheet body, a length of the fourth sheet body is L3, a length of the fifth sheet body is L4 and L3<L4.

6. The backlight module according to one of claim 2, wherein, at a connection location between the first sheet body and the second sheet body, a length of the first sheet body is L1, a length of the second sheet body is L2 and L1<L2; at a connection location between the fourth sheet body and the fifth sheet body, a length of the fourth sheet body is L3, a length of the fifth sheet body is L4 and L3<L4.

7. The backlight module according to one of claim 3, wherein, at a connection location between the first sheet body and the second sheet body, a length of the first sheet body is L1, a length of the second sheet body is L2 and L1<L2; at a connection location between the fourth sheet body and the fifth sheet body, a length of the fourth sheet body is L3, a length of the fifth sheet body is L4 and L3<L4.

8. The backlight module according to one of claim 1, wherein a surface of the first sheet body is coated with a diffusion layer, and the surface is formed of the first side surface of the first sheet body that faces the second sheet body.

9. The backlight module according to one of claim 2, wherein a surface of the first sheet body is coated with a diffusion layer, and the surface is formed of the first side surface of the first sheet body that faces the second sheet body.

10. The backlight module according to one of claim 3, wherein a surface of the first sheet body is coated with a diffusion layer, and the surface is formed of the first side surface of the first sheet body that faces the second sheet body.

11. The backlight module according to one of claim 5, wherein a surface of the first sheet body is coated with a diffusion layer, and the surface is formed of the first side surface of the first sheet body that faces the second sheet body.

12. The backlight module according to claim 1, wherein, the flexible circuit board disposed above the LED light sources is adhered and fixed to the third sheet body through a double-sided adhesive.

13. A display screen including a liquid crystal panel and a backlight module, wherein the backlight module includes:
a light guide plate;
multiple LED light sources disposed at a side of the light guide plate;
a flexible circuit board disposed above the LED light sources;
an optical film group disposed above a top surface of the light guide plate;
a plastic frame disposed at an outer periphery of the light guide plate, the LED light sources and the optical film group; and
a reflective sheet including a first sheet body, a second sheet body, a third sheet body, and a fourth sheet body;
wherein the first sheet body is a flat plate having multiple light transmitting holes and extending in a first direction, the first sheet body having first and second side surfaces that are opposite to each other, and the first sheet body is disposed between the light guide plate and the LED light sources such that the light guide plate and the LED light sources are respectively located at two opposite side surfaces of the first sheet body;
the second sheet body is formed by bending and integrally extending from a lower edge of the first sheet body in a direction toward the light guide plate, the second sheet body being disposed below a bottom surface of the light guide plate, wherein the second sheet body and the first sheet body collectively define a first space in which the light guide plate is received and supported on the second sheet body, the second sheet body being on the first side surface of the first sheet body;
the third sheet body is formed by bending and integrally extending from an upper edge of the first sheet body, which is opposite to the lower edge of the first sheet body, in a direction toward the LED light sources such that the third sheet body is on the second side surface of the first sheet body and is opposite to the second sheet body, the second sheet body and the third sheet body extending in opposite directions from the first sheet body and being respectively located on the first and second side surfaces of the first sheet body that are opposite to each other, and the third sheet body is disposed above the flexible circuit board; and the fourth sheet body is formed by bending and integrally extending from an edge of the third sheet body that is distant from the first sheet body such that the fourth sheet body and the first sheet body are opposite to and spaced from each other; wherein the fourth sheet body and the first sheet body face each other such that the first sheet body, the third sheet body and the fourth sheet body collectively define and delimit a receiving slot;

wherein the LED light sources are disposed in the receiving slot; the LED light sources are disposed toward the light guide plate, and locations of the LED light sources are corresponding to the light transmitting holes one by one such that lights emitted from the LED light sources can enter the light guide plate; and wherein the receiving slot that is defined collectively by the first sheet body, the third sheet body, and the fourth sheet body is located on the second side surface of the first sheet body such that the LED light sources received in the receiving slot are on the second side surface of the first sheet body and the light guide plate that is received in the space defined by the first sheet body and the second sheet body is located on the first side surface of the first sheet body and is opposite to the LED light sources.

* * * * *